United States Patent
Henriksen, Jr.

(10) Patent No.: US 9,587,663 B2
(45) Date of Patent: Mar. 7, 2017

(54) HIGH ANGLE SCREW FASTENER

(71) Applicant: Engineered Components Company, Elgin, IL (US)

(72) Inventor: Arne Henriksen, Jr., Algonquin, IL (US)

(73) Assignee: Engineered Components Company, Elgin, IL (US)

( * ) Notice: Subject to any disclaimer, the term of this patent is extended or adjusted under 35 U.S.C. 154(b) by 120 days.

(21) Appl. No.: 14/534,555

(22) Filed: Nov. 6, 2014

(65) Prior Publication Data
US 2016/0131172 A1     May 12, 2016

(51) Int. Cl.
| | | |
|---|---|---|
| F16B 25/00 | (2006.01) | |
| F16B 23/00 | (2006.01) | |
| F16B 35/06 | (2006.01) | |

(52) U.S. Cl.
CPC ...... *F16B 25/0021* (2013.01); *F16B 25/0031* (2013.01); *F16B 25/0068* (2013.01); *F16B 25/0084* (2013.01); *F16B 23/003* (2013.01); *F16B 35/06* (2013.01)

(58) Field of Classification Search
CPC .............. F16B 25/0068; F16B 25/0084; F16B 25/0078
USPC ................................. 411/386, 412, 417, 418
See application file for complete search history.

(56) References Cited

U.S. PATENT DOCUMENTS

| | | | | |
|---|---|---|---|---|
| 2,292,195 | A * | 8/1942 | Brown ................ | F16B 25/0021 408/218 |
| 2,871,751 | A * | 2/1959 | Lemke ................ | F16B 25/0084 411/411 |
| 4,235,149 | A * | 11/1980 | Veldman ............... | B21H 3/027 411/417 |
| 5,000,639 | A * | 3/1991 | Hinkley .............. | F16B 25/0084 411/386 |
| 5,244,327 | A * | 9/1993 | Whitesell ................. | F16B 5/02 411/386 |
| 5,964,560 | A | 10/1999 | Henriksen | |
| 6,832,882 | B2 * | 12/2004 | Janisch, Jr. ............. | F16B 33/00 411/366.3 |
| 7,377,734 | B2 * | 5/2008 | Bechtel, Jr. .............. | B21K 1/56 411/386 |
| 2008/0152460 | A1* | 6/2008 | Watanabe ................ | F16B 5/02 411/412 |

* cited by examiner

*Primary Examiner* — Flemming Saether
(74) *Attorney, Agent, or Firm* — Greer, Burns & Crain, Ltd.

(57) ABSTRACT

A threaded fastener for securing a first material to a support comprising a tapping point at a first end and a threaded shank with multiple separate leads. An end diameter of a fastener tip is in the range of 0.210 to 0.190 inches, the tapping point starts away from an end of the tip by a range of 0.320 to 0.40 inches, and the threads are arranged on the shank to provide a range of about 16½ to 17½ threads per inch for a 5/16 inch diameter fastener and about 18½ to 19½ threads per inch for a ¼ inch diameter fastener. A second portion of the shank, distal from the tap screw point, is unthreaded, and a head at an end opposite the tap screw point has an enlarged diameter and a countersunk shape to reduce the likelihood of pull through of the fastener through said first material.

20 Claims, 1 Drawing Sheet

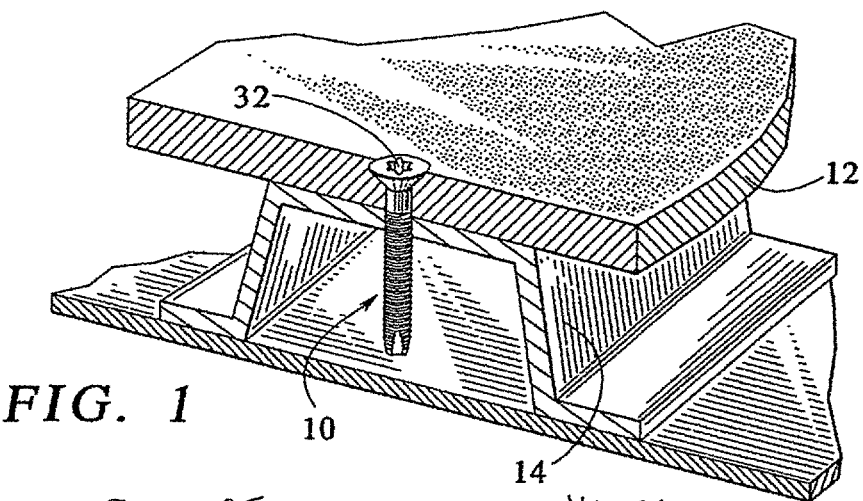
FIG. 1
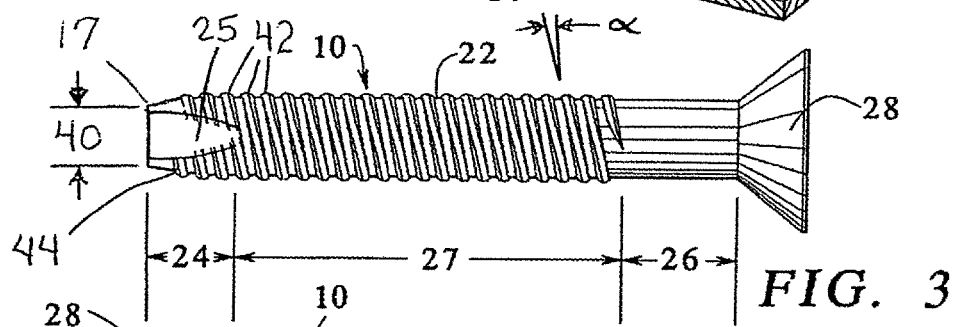
FIG. 3
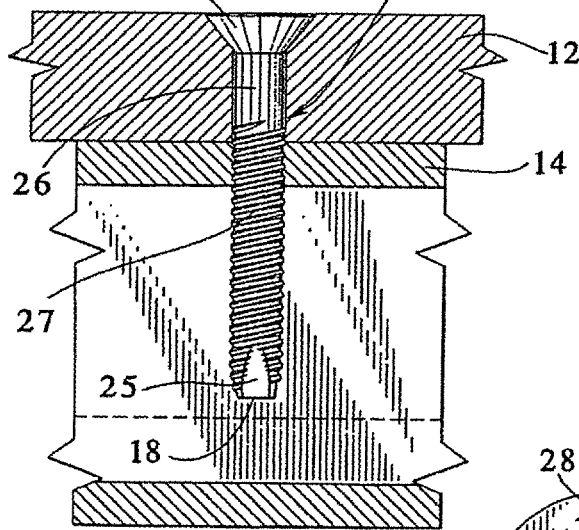
FIG. 2
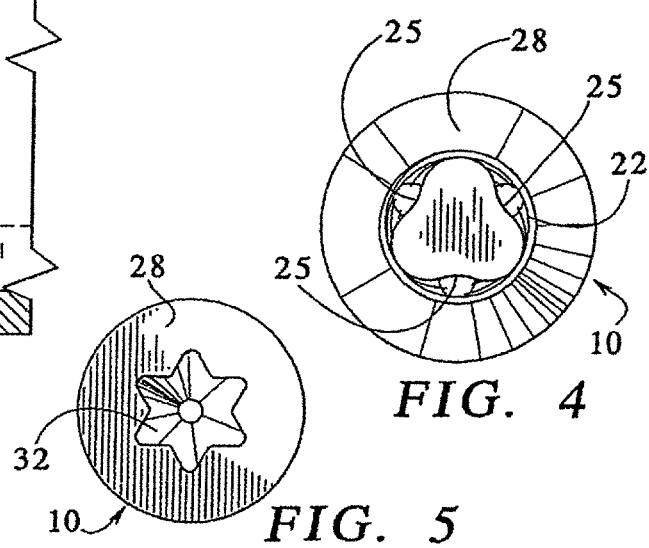
FIG. 4
FIG. 5

HIGH ANGLE SCREW FASTENER

BACKGROUND OF THE INVENTION

The present invention relates to a fastener, and in particular to a screw type threaded fastener used in securing two items together, such as a floor board to a truck body, or other similar application.

In certain environments, for example in the application of a wood or plastic material wall to metal channels, frames or plates in the interior of a semi-trailer truck body, threaded fasteners are used which need to address many different problems.

The threaded fastener should have some means for remaining secured to the metal frame so that the fastener will not come loose in the high vibration environment in which it is used.

Also, it is desirable for the fastener to thread quickly into the materials to be fastened together.

One fastener that addresses some of these problems is disclosed in U.S. Pat. No. 5,964,560, assigned to the assignee of the present application. That patent discloses a threaded fastener in which a shank of the screw has a first trilobular thread area which rolls threads rather than cutting threads for a tighter fit. The thread has flats provided at the tip and three threads formed on the shank have beginnings at the tapping point, with one lead starting at each lobe. The screw has 18 threads per inch when the shank has a diameter of 5/16 inches and 20 threads per inch when the shank has a diameter of 1/4 inches, thus resulting in a thread angle (when viewed from the side of the fastener) of about 11 degrees to provide a thread which will cause the fastener to be drawn into the material quickly, however, not so fast as to prevent the fastener from being able to cut into metal and to pull itself into the metal. The threads continue along the shank from the tip, but stop short of the head at an unthreaded portion of the shank.

SUMMARY OF THE INVENTION

The present invention provides an improved screw fastener which has particular utility in securing two items together, such as a wood, plastic material, aluminum or metal wall or other first material to a ferrous metal or aluminum support such as a ferrous metal or non-ferrous channel or frame. The improved fastener has a tapping point tip to make the screw self-tapping in order to form its own thread in both of the materials it is securing together by displacement of surrounding material rather than cutting of the surrounding material.

A shank of the screw has a first trilobular or quadlobular thread area which rolls threads rather than cutting threads for a tighter fit. The thread has flats provided at the tip and three or four threads formed on the shank have beginnings at the tapping point, with one lead starting at each lobe. Preferably the screw has 16½ to 17½ threads per inch when the shank has a diameter of 5/16 inches and 18½ to 19½ threads per inch when the shank has a diameter of ¼ inches, thus resulting in a thread angle (when viewed from the side of the fastener) of about 12 to 14 degrees. This will provide a higher angled thread which will cause the fastener to be drawn into the material more quickly than current fasteners, however, not so fast as to prevent the fastener from being able to cut into metal and to pull itself into the metal. The threads continue along the shank from the tip, but stop short of the head at an unthreaded portion of the shank. The combination of the thread angle of 12-14 degrees, rather than 11 degrees as in known fasteners, and 16½ to 17½ (18½ to 19½) threads per inch rather than 18 (20) threads per inch as in known fasteners, are the main reasons that provide this fastener with faster and easier driving than is available with the fastener disclosed in U.S. Pat. No. 5,964,560.

While these changes to the fastener will prevent this fastener from properly engaging with a standard 5/16 inch nut, this fastener is intended for a use in which the fastener is to be used without a nut, and instead, being driven into and forming its own thread into a truck trailer floor board. Therefore, the fact that it will not engage with a standard nut is not of any consequence.

A second modification of the fastener is a change to the starting point diameter. In presently available fasteners, the diameter is about 0.215 inches. The fastener of the present invention has a starting point diameter which is reduced to between 0.210 to 0.190 inches. This provides two advantages. First, it is easier for the operator of the screw gun to engage the tip of these fasteners in the pilot hole for the fastener since the point is smaller. The standard drill bit used in the trailer industry is 9/32, or 0.281 inches in diameter. A fastener starting point diameter of 0.210 to 0.190 inches fits easier into a 0.281 inch diameter hole than does a fastener starting point diameter of 0.215 inches. Second, the smaller diameter of the tip means that the fastener penetrates further into the floor board before driving of the fastener begins. This serves to reduce the time required to completely drive the fastener into the floor board.

A third modification of the fastener is a change to the starting location for the first starting thread. On a standard thread cutting screw, this dimension is about 0.312 inches from the end of the tip in a direction along the axis of the fastener. For the fastener of the present invention, this dimension is being increased to about 0.320 to 0.40 inches. Again, this increased dimension means that the fastener can be inserted further into the pilot hole before the threads engage the wall of the pilot hole to begin forming the threads. This shortens the time required for successful and complete insertion of the fastener into the floor board.

Since each standard 53 foot trailer requires at least about 1500 fasteners to be driven into the floor boards, a time savings of even a fraction of a second per fastener results in several minutes of time reduction for this portion of the assembly of the trailer. Further, this fastener is easier to insert and it drives in easier than previously available fasteners, thereby reducing the fatigue and effort required on the part of the person driving these fasteners, further improving efficiency and productivity of this portion of the trailer assembly process.

Above the threaded portion of the shank and the unthreaded portion is the screw head which has an enlarged diameter to prevent the head from pulling through the first material. Preferably the head is a countersunk style head which will allow the head to be drawn down into the first material until it is flush with the surface of the first material. Also, the head has a drive recess which preferably is a 6 lobe recess to give the fastener ease of driving without cam out and prevent unauthorized tampering with the fastener once it has been threaded into place. Once the fastener is driven into place, the angle of the thread offers higher break loose torque to prevent the part from coming out under vibration.

An optional further modification of the fastener is to provide the tip with four sides rather than three. This results in the fastener standing up straighter in the pilot hole at the beginning of the insertion process than a fastener with a three sided tip.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

FIG. 1 is a perspective view of a semi-trailer floor showing a fastener embodying the principles of the present invention in place.

FIG. 2 is a cross-sectional view of the fastener in place.

FIG. 3 is a side elevational view of the fastener alone.

FIG. 4 is an end view of the fastener taken from the point end.

FIG. 5 is an end view of the fastener taken from the head end.

DETAILED DESCRIPTION OF THE PREFERRED EMBODIMENTS

FIG. 1 illustrates an improved fastener embodying the principles of the present invention generally at 10. Although a fastener such as that disclosed and described can be used in many environments, for purposes of disclosure of the invention, one particular environment in which the fastener finds particular utility is shown. Such an environment is to secure a first or surface material, such as a floor board 12 generally formed of aluminum, hard wood or plastic, to a metal support 14, generally a channel member, frame or metal plate in the interior of a semi-trailer truck or truck body.

The fastener 10 itself is shown in greater detail in FIGS. 2-5.

A shank 22 of the fastener 10 includes a tip 17 with a trilobular or quadlobular thread tapping point 18 which rolls threads rather than cutting threads for a tighter fit. The thread tapping point 18 has a trilobular or quadlobular portion 24 with three or four flats 25 provided at the tip 17 and three or four separate threads are formed on the shank 22 with beginnings at the tapping point 18.

A first portion of the shank 22, adjacent to the first end 17, has a length and has a first and subsequent, such as, second, third and perhaps fourth separate leads and first, second, third and perhaps fourth separate threads 42 formed thereon. The first lead is connected to the first thread and the subsequent leads are connected to the subsequent threads 42. The first and subsequent threads 42 are separate from one another whereby the first thread is not connected to the subsequent threads and the subsequent threads are not connected to each other. The first, second, third and perhaps fourth separate threads 42 extend helically and continuously along the length of the first portion of the shank.

The starting location 44 for the first starting thread 42 may be changed in this fastener 10 as compared to presently available fasteners. On a standard thread cutting screw, this dimension is about 0.312 inches from the end of the tip 17 as measured along a longitudinal axis of the fastener 10. For the fastener 10 of the present invention, this dimension 46 is being increased to a range of 0.320 inches to 0.40 inches, and preferably about 0.385 inches. This increased dimension means that the fastener 10 can be inserted further into a pilot hole before the threads 42 begin to engage the wall of the pilot hole to begin forming the threads in the floor board 12. This shortens the time required for successful and complete insertion of the fastener 10 into the floor board 12.

The fastener 10 is provided with the tip 17 at a first end having the tapping point 18 designed to provide actual tapping action to permit the fastener to tap through both the floor board 12 as well as the metal support 14. In a standard self-tapping ⅜ inch fastener, a starting point tip diameter 40 is about 0.215 inches. However, in the present fastener 10, this dimension has been reduced to between 0.210 inches and 0.190 inches and preferably to about 0.195 inches.

This provides two advantages. First, it is easier for the operator of a screw gun used to drive these fasteners 10 to engage the tip 17 of these fasteners in a pilot hole for the fastener since the tip is smaller. The standard drill bit used in the trailer industry for pilot holes is 9/32 inches, or 0.281 inches in diameter. A fastener starting point diameter of 0.210 to 0.190 inches fits easier into a 0.281 inch diameter hole than does a fastener starting point diameter of 0.215 inches. Second, the smaller diameter of the tip 17 means that the fastener 10 penetrates further into the floor board 12 before driving of the fastener begins. This also serves to reduce the time required to completely drive the fastener 10 into the floor board.

The trilobular or quadlobular portion 24 has three or four flat areas 25 (FIG. 4) such that three or four separate lead in areas for three or four separate threads begin at the tapping point to ensure quick starting of the thread formation in the surrounding material.

The fastener 10 may have 16½ to 17½ threads per inch, preferably 17 threads per inch, rather than the industry standard of 18 threads per inch, when the shank 22 has a diameter of 5/16 inches and 18½ to 19½, preferably 19 threads per inch, rather than the industry standard of 20 threads per inch, when the shank has a diameter of ¼ inches. This results in a thread angle $\alpha$ (when viewed from the side of the fastener) in the range of about 12 to 14 degrees, and preferably 13 degrees to provide a thread 42 which will cause the fastener to be drawn into the material more quickly than current fasteners, however, not so fast as to prevent the fastener from being able to cut into metal and to pull itself into the metal. Most standard fasteners have a thread angle of about 5 degrees, while U.S. Pat. No. 5,964,560 teaches a thread angle of about 11 degrees.

The threads 42 continue along the shank 22 from the tip 17, but stop short of the head 28 at an unthreaded portion 26 of the shank. A central threaded portion 27 has a standard circular cross section.

The combination of the thread angle of 12-14 degrees, rather than 11 degrees, and 16½ to 17½ (18½ to 19½) threads per inch rather than 18 (20) threads per inch, are the main reasons that provide this fastener 10 with faster and easier driving than is available with the fastener disclosed in U.S. Pat. No. 5,964,560. Testing has also demonstrated an increase of over 5% in the amount of force required to pull the fasteners embodying the present invention out of a floor board over the force required to pull out fasteners of the type disclosed in U.S. Pat. No. 5,964,560.

Specifically, a group of three 5/16th inch fasteners having a thread angle of 11 degrees and 18 threads per inch were caused to be axially pulled out of a metal bracket of the type used in a truck body. It was measured that it required, on average, an axially directed load of 3,419 pounds to cause the fastener to fail by stripping the threads from the metal bracket. Another group of three 5/16th inch fasteners having a thread angle of 13 degrees and 17 threads per inch were caused to be axially pulled out of the same metal bracket. In this case, it required, on average, an axially directed load of 3,613 pounds to cause the fastener to fail by stripping the threads from the metal bracket, an increase of about 5.7%.

While these changes to the fastener 10 will prevent this fastener from properly engaging with a standard 5/16 inch nut, this fastener is intended for a use in which the fastener is to be used without a nut, and instead, being driven into and forming its own thread into a truck trailer floor board. Thus, the fact that it will not engage with a standard nut is not of any consequence.

Most distal from the tapping point end is a head 28 of the fastener. A diameter of the head 28 is enlarged beyond the diameter of the shank 22 to prevent a pull through of the fastener 10 relative to the floor board 12. Preferably the head 28 is a countersunk or recess style flat head which will allow the head to be drawn down into the first material 12 until it is flush with the surface of the first material. Also, the head has a drive recess 32 which preferably is a 6 lobe recess to prevent unauthorized tampering with the fastener once it has been threaded into place, to reduce tool wear and also to prevent cam out while the fastener is being driven.

A length of the threaded portion 27 is selected to assure positioning of the threaded portion 27 within the metal support wall area 14 upon complete insertion of the screw 10. A length of the unthreaded portion 26 is selected to be long enough to accommodate the thickness of the floor board 12 and to position the threaded portion 27 in the metal support wall.

Although a most preferred embodiment would have the length of the unthreaded portion 26 plus the height of the head 28 exactly equal to a thickness of the surface material 12, so that the fastener 10 can be threaded down tight to the underlying support such as the metal support 14, without any binding interference due to engagement of threads in the surface material, it is not always possible to be assured of such precise measurements. It is necessary, however, that the threads start immediately below the surface material 12 in that the support material 14 may, in many instances, be no more than 1/8 inches thick. Thus, if the unthreaded portion 26 extended below the surface material 12, there would not be any threads present to engage with the support member 14.

Since surface materials used with truck bodies range from about 3/4 inches to 1 3/8 inches, and to avoid a large inventory of different sized screws with different unthreaded lengths 26, it has been determined that an unthreaded length of 1/2 inches to 5/8 inches (when including the head axial length) is sufficient to provide the necessary function for the unthreaded portion. Because it is helpful to prevent a binding of threads in the surface material 12, by having this amount of unthreaded portion 26, the remaining threaded portion which remains in the surface material is insufficient to cause a binding. In fact, this area breaks away since the surface material is generally wood or plastic material and the unthreaded region 26 provides an unhindered area for relief of portions of the surrounding material to break away to, upon continued rotation of the threaded fastener after the head 28 has "bottomed out" into the surface material.

FIG. 5 illustrates the head end of the screw where it is seen that there is a special drive socket 32, such as a 6 lobe design, which helps to eliminate or reduce tool wear and also to prevent cam out while driving the fastener.

Thus it is seen that the present invention provides an improved threaded fastener which addresses a number of problems in particular fastening environments and provides for self-tapping for the fastener, a threaded portion which enhances gripping, an unthreaded portion for engaging a material to be held in place, and an enlarged head for preventing pull through of the fastener through the held material.

Applicant has found that this particular fastener, with the higher thread angle, the fewer threads per inch and the smaller dimensioned tip surprisingly and unexpectedly runs or installs faster than previously used fasteners. This fastener also surprisingly results in less fatigue to the persons installing it. Also, this fastener requires a higher pull out force than previously used fasteners, thus improving the tendency for this fastener to avoid being stripped out in high vibration environments.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A threaded fastener for securing a first material to a second material comprising:
    a first end having a tapping point formed thereon for forming a threaded passage for said fastener through said first material and said second material;
    said tapping point being located at a tip of said fastener, said tip having an end diameter within the range of 0.210 to 0.190 inches,
    a threaded shank;
    a first portion of said shank, adjacent to said first end, having a length and having multiple separate leads and multiple separate threads formed thereon, a first lead being connected to a first thread and subsequent leads being connected to subsequent threads, the first and subsequent threads being separate from one another whereby the first thread is not connected to the subsequent threads and the subsequent threads are not connected to each other, the first and subsequent separate threads extending helically and continuously along the length of the first portion of the shank,
    said threaded shank having a diameter of 5/16 inches and said threads being arranged on said shank at a spacing to provide a range of about 16 1/2 to 17 1/2 threads per inch,
    a head at an end opposite said first end having an enlarged diameter for reducing the likelihood of pull through of said fastener through said first material and said second material,
    a second portion of said shank, distal from said first end, said second portion being unthreaded, the first and second portions of the shank being of a uniform diameter, and
    a drive recess formed in said head.

2. The threaded fastener according to claim 1, wherein said tip has an end diameter of about 0.195 inches.

3. The threaded fastener according to claim 1, wherein said threads are arranged at a spacing to provide 17 threads per inch.

4. The threaded fastener according to claim 1, wherein said first end has a trilobular thread design.

5. The threaded fastener according to claim 1, wherein said first end has a quadlobular thread design.

6. The threaded fastener according to claim 1, wherein said tapping point has a starting location for a starting end of each of said multiple threads, said starting points being spaced away from an end of said tip of said fastener by a distance in the range of 0.320 to 0.40 inches.

7. A threaded fastener for securing a first material to a second material comprising:

a first end having a tapping point formed thereon for forming a threaded passage for said fastener through said first material and said second material;

said tapping point having a starting location for a starting end of each of said multiple threads, said starting points being spaced away from an end of said tip of said fastener by a distance in the range of 0.320 to 0.40 inches, a threaded shank;

a first portion of said shank, adjacent to said first end, having a length and having multiple separate leads and multiple separate threads formed thereon, a first lead being connected to a first thread and subsequent leads being connected to subsequent threads, the first and subsequent threads being separate from one another whereby the first thread is not connected to the subsequent threads and the subsequent threads are not connected to each other, the first and subsequent separate threads extending helically and continuously along the length of the first portion of the shank, said threaded shank having a diameter of 5/16 inches and said threads being arranged on said shank at a spacing to provide a range of about 16½ to 17½ threads per inch, a head at an end opposite said first end having an enlarged diameter for reducing the likelihood of pull through of said fastener through said first material and said second material, a second portion of said shank, distal from said first end, said second portion being unthreaded, the first and second portions of the shank being of a uniform diameter, and a drive recess formed in said head.

8. The threaded fastener according to claim 7, wherein said tapping point starting location is spaced away from said tip by a distance of 0.385 inches.

9. The threaded fastener according to claim 7, wherein said threads are arranged at a spacing to provide 17 threads per inch.

10. The threaded fastener according to claim 7, wherein said first end has a trilobular thread design.

11. The threaded fastener according to claim 7, wherein said first end has a quadlobular thread design.

12. A threaded fastener for securing a first material to a second material comprising:

a first end having a tapping point formed thereon for forming a threaded passage for said fastener through said first material and said second material;

said tapping point being located at a tip of said fastener, said tip having an end diameter within the range of 0.210 to 0.190 inches, said tapping point having a starting location for a starting end of each of said multiple threads, said starting points being spaced away from an end of said tip of said fastener by a distance in the range of 0.320 to 0.40 inches, a threaded shank;

a first portion of said shank, adjacent to said first end, having a length and having multiple separate leads and multiple separate threads formed thereon, a first lead being connected to a first thread and subsequent leads being connected to subsequent threads, the first and subsequent threads being separate from one another whereby the first thread is not connected to the subsequent threads and the subsequent threads are not connected to each other, the first and subsequent separate threads extending helically and continuously along the length of the first portion of the shank, a head at an end opposite said first end having an enlarged diameter for reducing the likelihood of pull through of said fastener through said first material and said second material, a second portion of said shank, distal from said first end, said second portion being unthreaded, the first and second portions of the shank being of a uniform diameter, and a drive recess formed in said head.

13. The threaded fastener according to claim 12, wherein said tip has an end diameter of about 0.195 inches.

14. The threaded fastener according to claim 12, wherein said tapping point starting location is spaced away from said tip by a distance of 0.385 inches.

15. The threaded fastener according to claim 12, wherein said threaded shank has a diameter of 5/16 inches and said threads are arranged on said shank at a spacing to provide a range of about 16½ to 17½ threads per inch.

16. The threaded fastener according to claim 15, wherein said threads are arranged at a spacing to provide 17 threads per inch.

17. The threaded fastener according to claim 12, wherein said threaded shank has a diameter of ¼ inches and said threads are arranged on said shank at a spacing to provide a range of about 18½ to 19½ threads per inch.

18. The threaded fastener according to claim 17, wherein said threads are arranged at a spacing to provide 19 threads per inch.

19. The threaded fastener according to claim 12, wherein said first end has a trilobular thread design.

20. The threaded fastener according to claim 12, wherein said first end has a quadlobular thread design.

* * * * *